US008063862B2

(12) United States Patent
Hisatake

(10) Patent No.: US 8,063,862 B2
(45) Date of Patent: Nov. 22, 2011

(54) LIQUID CRYSTAL DISPLAY DEVICE

(75) Inventor: Yuuzo Hisatake, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 1230 days.

(21) Appl. No.: 11/583,842

(22) Filed: Oct. 20, 2006

(65) Prior Publication Data

US 2007/0091045 A1 Apr. 26, 2007

(30) Foreign Application Priority Data

Oct. 21, 2005 (JP) ................................. 2005-306882

(51) Int. Cl.
*G09G 3/36* (2006.01)
(52) U.S. Cl. ................ 345/88; 345/89; 345/90; 345/99; 345/103; 345/690; 345/694; 345/695; 345/696; 349/56; 349/61; 349/79; 349/80; 349/97
(58) Field of Classification Search .............. 345/99, 345/103, 690, 694, 695, 696, 88–90, 964–966; 349/56, 61, 79, 80, 97, 104, 106
See application file for complete search history.

(56) References Cited

U.S. PATENT DOCUMENTS

| 2003/0222840 A1* | 12/2003 | Koga et al. ........................ 345/89 |
| 2005/0264587 A1* | 12/2005 | Kurumisawa ................. 345/690 |
| 2006/0022928 A1* | 2/2006 | Kim et al. ........................ 345/94 |

FOREIGN PATENT DOCUMENTS

| JP | 11-102170 | 4/1999 |
| JP | 2001-154636 | 6/2001 |
| JP | 2002-149116 | 5/2002 |
| JP | 2002-229531 | 8/2002 |
| JP | 2003-295160 | 10/2003 |
| JP | 2004-529396 | 9/2004 |
| JP | 2005-62833 | 3/2005 |

OTHER PUBLICATIONS

N. Kimura et al., "60.2: New Technologies for Large-Sized High-Quality LCD TV," SID 05 Digest, pp. 1734-1737 (2005).
S. Kim, "66.1: *Invited Paper*: The World's Largest (82-in.) TFT-LCD," SID 05 Digest, pp. 1842-1847 (2005).
Notice of Reasons for Rejection mailed by Japanese Patent Office on Jun. 21, 2011 in Japanese Application No. 2005-306882 and English translation thereof.

* cited by examiner

*Primary Examiner* — Richard Hjerpe
*Assistant Examiner* — Saifeldin Elnafia
(74) *Attorney, Agent, or Firm* — Finnegan, Henderson, Farabow, Garrett & Dunner, L.L.P.

(57) ABSTRACT

A liquid crystal display device includes a display section which enables color display in each of pixels, and a gradation control unit which controls a gradation level in each of the pixels. The display section includes a first white display structure which is configured to combine primary colors and to display white, and a second white display structure which is configured to include a color with a chromaticity different from a chromaticity of the primary color of the first white display structure and to display white. The gradation control unit has a first control mode in which the gradation level of each pixel is controlled by one of the first white display structure and the second white display structure, and a second control mode in which the gradation level of each pixel is controlled by a combination of the first white display structure and the second white display structure.

12 Claims, 11 Drawing Sheets

RGB-CF

RGBW-CF

Up-and-down azimuth direction

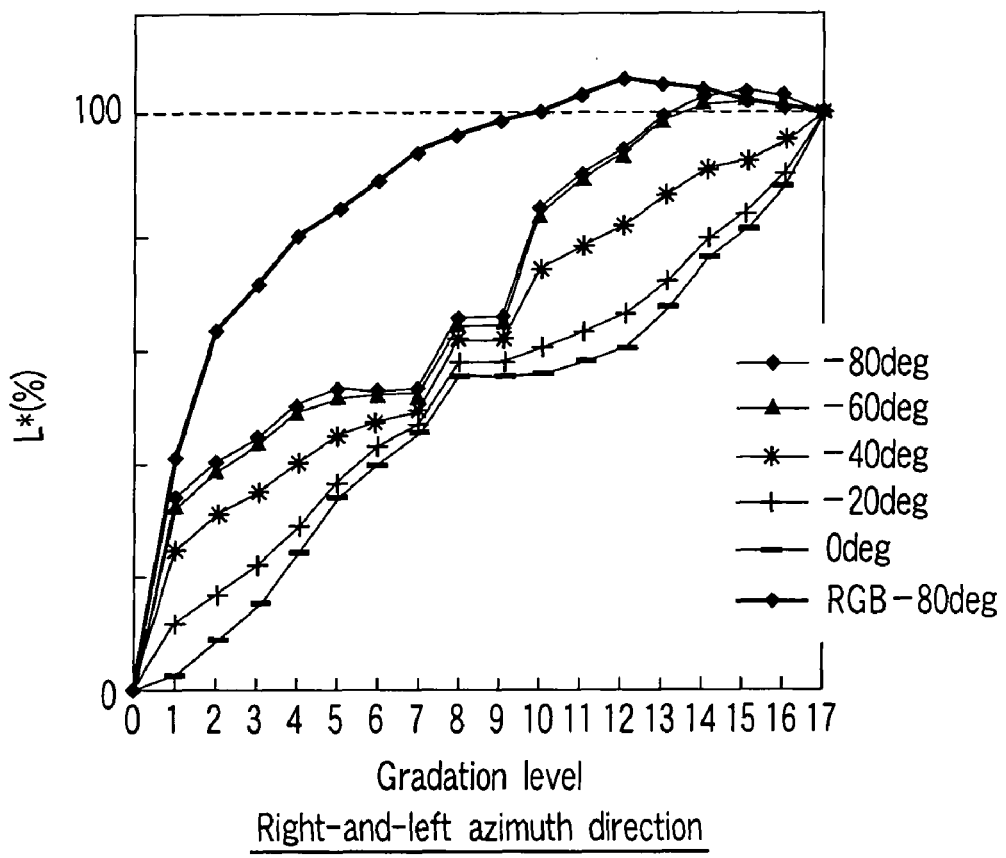
Gradation level
Right-and-left azimuth direction
F I G. 14B
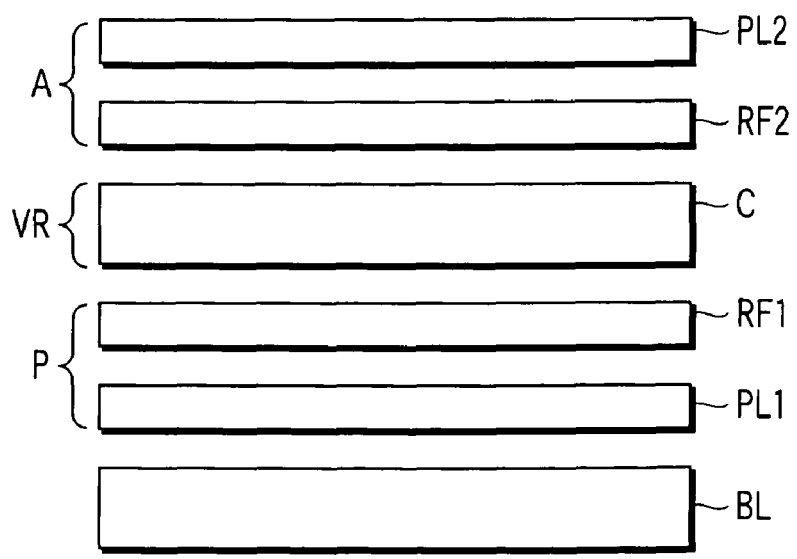
F I G. 15

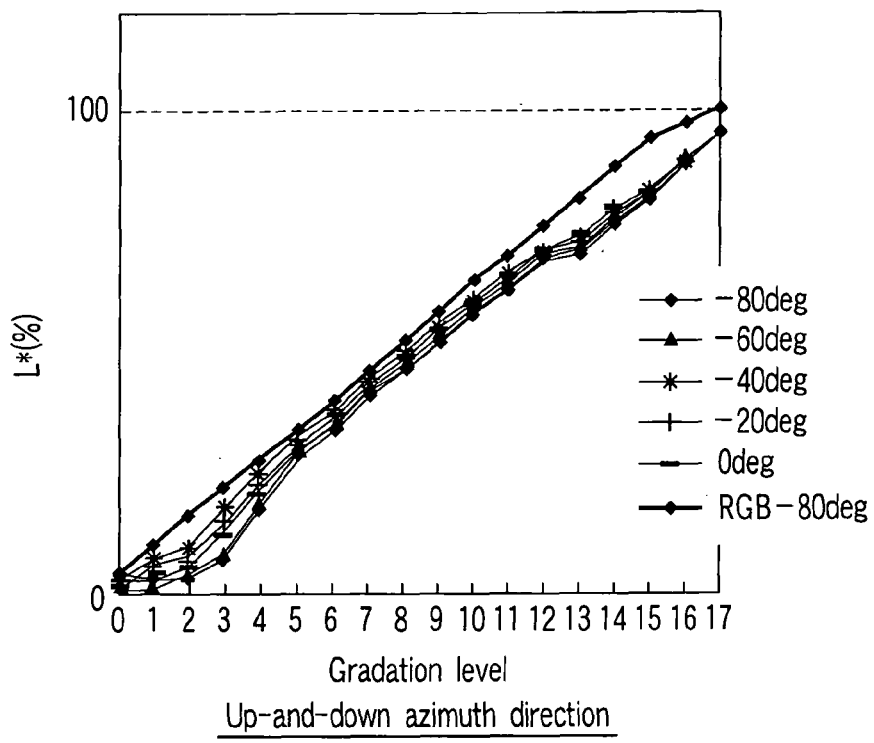
F I G. 16A
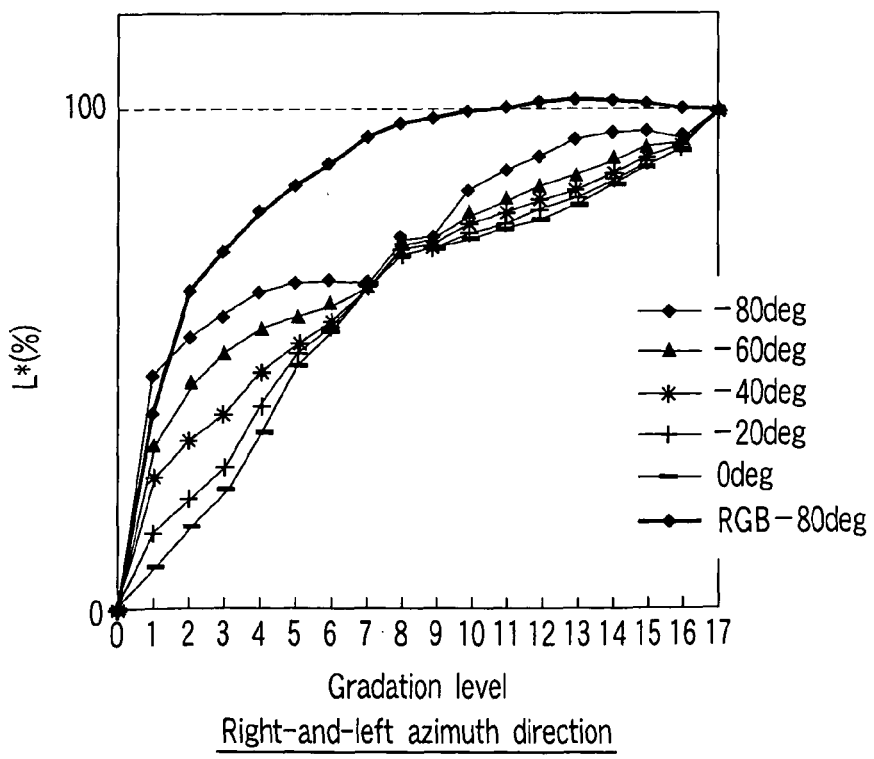
F I G. 16B

LIQUID CRYSTAL DISPLAY DEVICE

CROSS-REFERENCE TO RELATED APPLICATIONS

This application is based upon and claims the benefit of priority from prior Japanese Patent Application No. 2005-306882, filed Oct. 21, 2005, the entire contents of which are incorporated herein by reference.

BACKGROUND OF THE INVENTION

1. Field of the Invention

The present invention relates generally to a liquid crystal display device, and more particularly to a dot-matrix-type liquid crystal display device which can perform color display.

2. Description of the Related Art

A liquid crystal display device has various features such as thickness in size, light weight, and low power consumption. The liquid crystal display device is applied to various uses, e.g. OA equipment, information terminals, timepieces, and TVs. In particular, a liquid crystal display device comprising thin-film transistors (TFTs) has high responsivity and, therefore, it is used as a monitor of a mobile TV, a computer, etc., which displays a great deal of information.

In recent years, with an increase in quantity of information, there has been a strong demand for higher image definition and higher display speed. Of these, the higher image definition is realized, for example, by making finer the array structure of the TFTs.

On the other hand, in order to increase the display speed, consideration has been given to, in place of conventional display modes, an OCB (Optically Compensated Bend) mode, a VAN (Vertically Aligned Nematic) mode, a HAN (Hybrid Aligned Nematic) mode and a π alignment mode, which use nematic liquid crystals, and an SSFLC (Surface-Stabilized Ferroelectric Liquid Crystal) mode and an AFLC (Anti-Ferroelectric Liquid Crystal) mode, which use smectic liquid crystals.

Of these display modes, the VAN mode, in particular, has a higher response speed than in the conventional TN (Twisted Nematic) mode. An additional feature of the VAN mode is that a rubbing process, which may lead to a defect such as an electrostatic breakage, can be made needless by vertical alignment. Particular attention is drawn to a multi-domain VAN mode (hereinafter referred to as "MVA mode") in which a viewing angle can be increased relatively easily.

In the MVA mode, for example, mask rubbing and pixel electrode structures are devised, or a protrusion is provided within a pixel. Thereby, the inclination of an electric field, which is applied to the pixel region from the pixel electrode and counter-electrode, is controlled. The pixel region of the liquid crystal layer is divided into, e.g. four domains such that the alignment directions of liquid crystal molecules are inclined at 90° to each other in a voltage-on state. This realizes improvement in symmetry of viewing angle characteristics and suppression of an inversion phenomenon.

In addition, a negative retardation plate is used to compensate the viewing angle dependency of the phase difference of the liquid crystal layer in the state in which the liquid crystal molecules are oriented substantially vertical to the major surface of the substrate, that is, in the state of black display. Thereby, the contrast (CR) that depends on the viewing angle is improved. Besides, more excellent viewing angle/contrast characteristics can be realized in the case where the negative retardation plate is a biaxial retardation plate having such an in-plane phase difference as to compensate the viewing angle dependency of the polarizer plate, too.

In the conventional MVA mode, however, the compensation of the viewing angle at the time of displaying intermediate gradations or white is insufficient, and the gradation characteristics are different between a case in which the liquid crystal display device is observed in its normal direction and a case in which the liquid crystal display device is observed in an oblique direction to the normal direction. Consequently, in a case where the liquid crystal display device, which performs multi-color display, is observed in an oblique direction, intermediate gradations are degraded and become generally whitish. For example, in a MVA mode liquid crystal display device in which one pixel is divided into four domains, the luminance at the time when intermediate gradations are displayed and observed in an oblique direction would become substantially equal to the luminance at the time of white display, and the intermediate gradations are visually recognized as generally whitish display.

To cope with this problem, there has been proposed a technique in which one frame, which displays an image, is divided into a plurality of sub-frames, and the gradation levels are controlled on the basis of the luminances in the respective sub-frames (see, e.g. N. kimura et al., "60.2: Invited Paper: New Technologies for Large-Sized High-Quality LCD TV", SID'05 DIGEST, pp. 1734-1737 (2005)). In addition, there has been proposed a technique in which each pixel is divided into a plurality of sub-pixels, and the gradation levels are controlled on the basis of the luminances in the respective sub-pixels (see, e.g. Sang Soo Kim, "66.1: Invited Paper: The World's Largest (82-in.) TFT-LCD", SID'05 DIGEST, pp. 1842-1847 (2005)).

BRIEF SUMMARY OF THE INVENTION

The object of the present invention is to provide a liquid crystal display device which can improve a display quality regardless of a viewing angle, and can increase a color reproduction range.

According to an aspect of the present invention, there is provided a liquid crystal display device of a dot-matrix type which includes a liquid crystal layer held between a pair of substrates, comprising: a display section which enables color display in each of pixels; and a gradation control unit which controls a gradation level in each of the pixels, wherein the display section includes a first white display structure which is configured to combine primary colors and to display white, and a second white display structure which is configured to include a color with a chromaticity different from a chromaticity of the primary color of the first white display structure and to display white, and the gradation control unit has a first control mode in which the gradation level of each pixel is controlled by one of the first white display structure and the second white display structure, and a second control mode in which the gradation level of each pixel is controlled by a combination of the first white display structure and the second white display structure.

The present invention can provide a liquid crystal display device which can improve a display quality regardless of a viewing angle, and can increase a color reproduction range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 14B is a view showing a measurement result of output characteristics of a relative brightness to gradation levels in a right-and-left azimuth direction of the screen of the liquid crystal display device according to Example 1;

FIG. 15 is a view for describing the structure of a liquid crystal display device according to Example 2 of the first embodiment;

FIG. 16A is a view showing a measurement result of output characteristics of a relative brightness to gradation levels in an up-and-down azimuth direction of the screen of the liquid crystal display device according to Example 2;

FIG. 16B is a view showing a measurement result of output characteristics of a relative brightness to gradation levels in a right-and-left azimuth direction of the screen of the liquid crystal display device according to Example 2;

DETAILED DESCRIPTION OF THE INVENTION

A liquid crystal display device according to an embodiment of the present invention will now be described with reference to the accompanying drawings.

Figure 1:
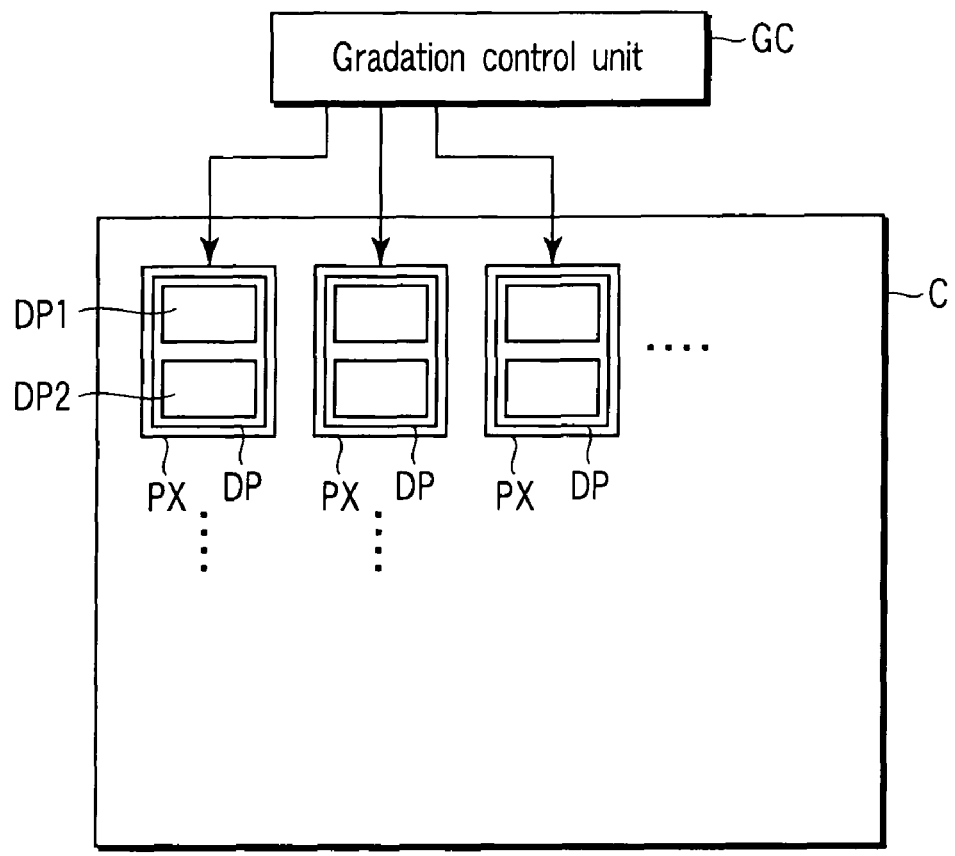
FIG. 1 is a view for describing the structure of a liquid crystal display device according to an embodiment of the present invention.

As shown in FIG. 1, the liquid crystal display device includes a liquid crystal cell C having such a structure that a liquid crystal layer is held between a pair of substrates. The liquid crystal cell C has pixels PX which are arranged in a matrix. Each pixel PX includes a display section DP which can effect color display. In addition, the liquid crystal display device includes a gradation control unit GC which controls gradation levels in each pixel PX.

The display section DP includes a first white display structure DP1 which is configured to effect white display by combining primary colors (e.g. combining the primary colors of red, green and blue which are used in additive color mixture, or combining the primary colors of cyan, magenta and yellow which are used in subtractive color mixture), and a second white display structure DP2 which is configured to include a color of a chromaticity different from the primary colors of the first white display structure DP1 and to effect white display.

The gradation control unit GC has a first control mode in which the gradation level of each pixel PX is controlled by one of the first white display structure DP1 and second white display structure DP2, and a second control mode in which the gradation level of each pixel PX is controlled by a combination of the first white display structure DP1 and second white display structure DP2.

More specific embodiments will be described below.

First Embodiment

Sub-Pixel Structure

In a first embodiment, the display section that is disposed in each pixel PX is configured to include a plurality of sub-pixels. In other words, one pixel is composed of these sub-pixels. The first embodiment will be described below, by referring to first to third examples of structure.

<<First Example of Structure>>

Figure 2:
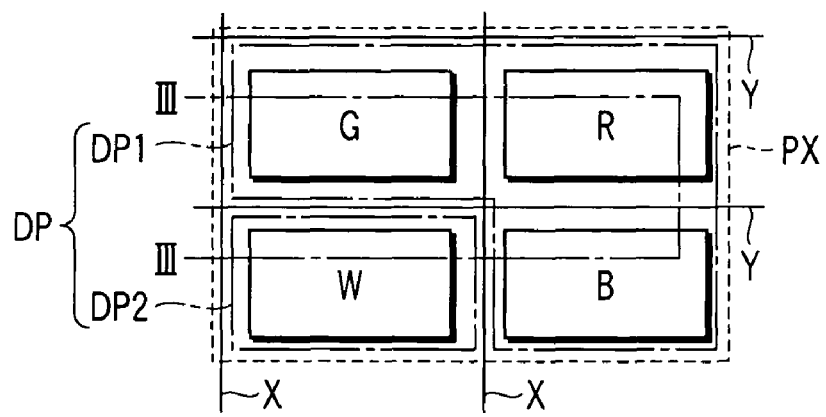
FIG. 2 schematically shows the structure of a display section of a liquid crystal display device according to a first example of structure in the first embodiment of the invention.

As is shown in FIG. 2, in a liquid crystal display device according to a first example of structure, each pixel PX has a display section DP comprising a first white display structure DP1 and a second white display structure DP2. The first white display structure DP1 is composed of sub-pixels of the primary colors. In the example shown in FIG. 2, the first white display structure DP1 is composed of three sub-pixels of red (R), green (G) and blue (B). Alternatively, the first white display structure DP1 may be composed of three sub-pixels of cyan (C), magenta (M) and yellow (Y). The second white display structure DP2 is composed of a single sub-pixel of white (W). In short, in the first example of structure, one pixel PX is composed of four sub-pixels R, G, B and W.

Figure 3:
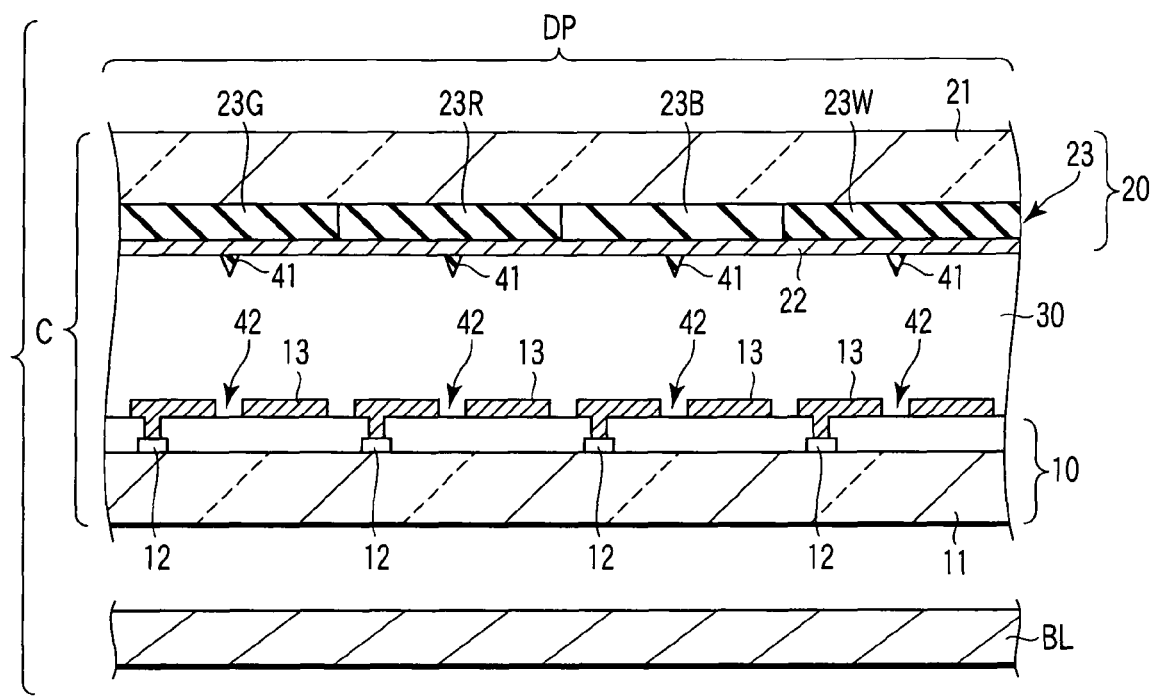
FIG. 3 is a cross-sectional view, taken along line III-III in FIG. 2, which schematically shows the structure of the display section of the liquid crystal display device shown in FIG. 2.

A more specific structure is described. As shown in FIG. 2 and FIG. 3, a liquid crystal cell C is configured such that a liquid crystal layer 30 is held between an array substrate 10 and a counter-substrate 20. The array substrate 10 is formed by using an insulating substrate 11 such as a glass substrate. The array substrate 10 includes a plurality of scanning lines Y which are arranged along the rows of the sub-pixels R, G, B and W; a plurality of signal lines X which are arranged along the columns of the sub-pixels R, G, B and W; switching elements 12 which are disposed near intersections between the scanning lines Y and signal lines X in association with the sub-pixels R, G, B and W; and pixel electrodes 13 which are disposed in association with the sub-pixels R, G, B and W and are connected to the associated switching elements 12. The surfaces of the pixel electrodes 13 are covered with an alignment film (not shown).

The scanning lines Y are connected to a scanning line driver which is included in the gradation control unit GC. The signal lines X are connected to a signal line driver which is included in the gradation control unit GC. The switching element 12 is composed of, e.g. a thin-film transistor. In the case of a transmissive liquid crystal cell, the pixel electrode 13 is formed of a light-transmissive electrically conductive material such as indium tin oxide (ITO). In the case of a reflective liquid crystal cell, the pixel electrode 13 is formed of a light-reflective electrically conductive material such as aluminum.

The counter-substrate 20 is formed by using an insulating substrate 21 such as a glass substrate, and includes a counter-electrode 22 which is common to a plurality of pixels. The surface of the counter-electrode 22 is covered with an alignment film (not shown). The counter-electrode 22 is formed of a light-transmissive electrically conductive material such as indium tin oxide (ITO).

Each display section DP includes a color filter for enabling color display. In the first embodiment, a color filter 23 is provided on the counter-substrate 20. The red sub-pixel R includes a red resist 23R which mainly passes a red wavelength component, which is included in white light that is emitted from a backlight BL which is disposed on the back side of the array substrate 10 and functions as an area light source device. The green sub-pixel G includes a green resist 23G which mainly passes a green wavelength component, which is included in white light that is emitted from the backlight BL. The blue sub-pixel B includes a blue resist 23B which mainly passes a blue wavelength component, which is included in white light that is emitted from the backlight BL. The white sub-pixel W includes an achromatic resist 23W which passes white light that is emitted from the backlight BL.

The alignment films, which cover the surfaces of the array substrate 10 and counter-substrate 20, impart vertical alignment properties to liquid crystal molecules of the liquid crystal layer 30 (i.e. properties to align liquid crystal molecules in a normal direction to the major surface of the substrate) in the state in which no voltage is applied between the pixel electrodes 13 and the counter-electrode 22. In particular, in an MVA mode liquid crystal display device, an alignment control is executed in the liquid crystal cell C such that liquid crystal molecules in the sub-pixel are aligned at least in two directions in a voltage-on state.

This alignment control can be realized by providing protrusions 41 for a multi-domain control within the sub-pixel, for example, as shown in FIG. 3. This alignment control can also be realized by providing slits 42 for a multi-domain control in parts of at least one of the pixel electrode 13, which is disposed in each sub-pixel, and the counter-electrode 22. Furthermore, this alignment control can be realized by providing alignment films, which are subjected to alignment treatment for a multi-domain control, such as rubbing, on those surfaces of the array substrate 10 and counter-substrate 20, which hold the liquid crystal layer 30. Needless to say, at least two of the protrusion 41, slit 42 and the alignment film that is subjected to alignment treatment may be combined.

<<Second Example of Structure>>

Figure 4:
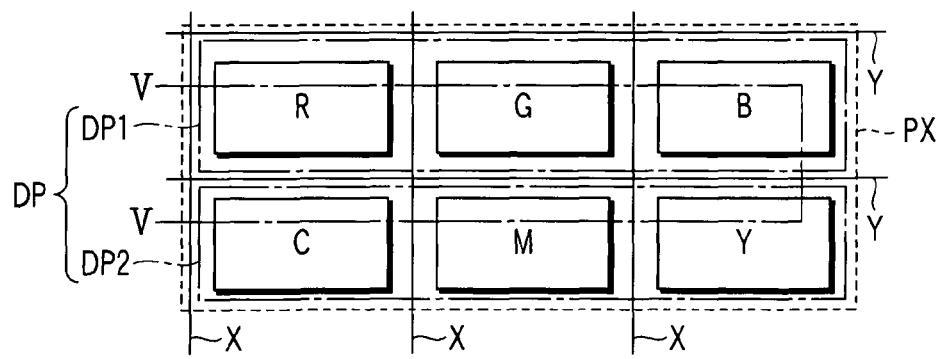
FIG. 4 schematically shows the structure of a display section of a liquid crystal display device according to a second example of structure in the first embodiment of the invention.

As is shown in FIG. 4, in a liquid crystal display device according to a second example of structure, each pixel PX has a display section DP comprising a first white display structure DP1 and a second white display structure DP2. The first white display structure DP1 is composed of three sub-pixels of red (R), green (G) and blue (B). The second white display structure DP2 is composed of three sub-pixels of cyan (C), magenta (M) and yellow (Y). In short, in the second example of structure, one pixel PX is composed of six sub-pixels R, G, B, C, M and Y.

Figure 5:
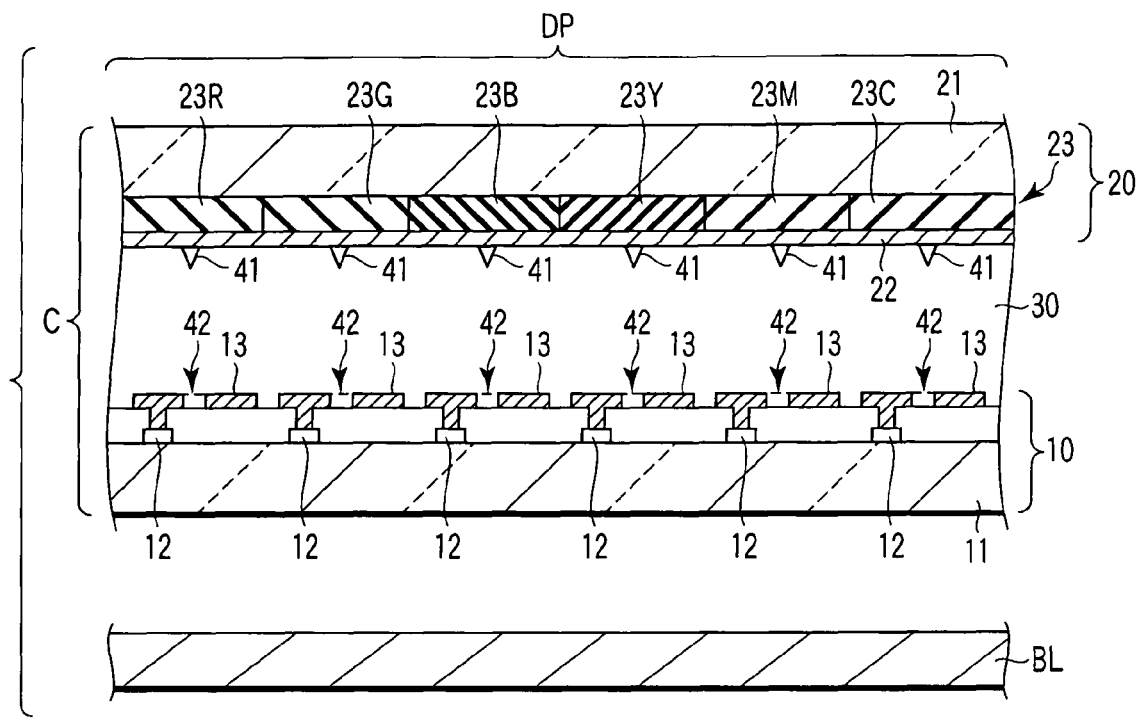
FIG. 5 is a cross-sectional view, taken along line V-V in FIG. 4, which schematically shows the structure of the display section of the liquid crystal display device shown in FIG. 4.

A more specific structure is described. The concrete structure of each sub-pixel is the same as in the first example of structure. The structural elements common to those in the first example of structure are denoted by like reference numerals, and a detailed description thereof is omitted. As shown in FIG. 4 and FIG. 5, switching elements 12 are disposed near intersections between the scanning lines Y and signal lines X in association with the sub-pixels R, G, B, C, M and Y. Pixel electrodes 13 are also disposed in association with the sub-pixels R, G, B, C, M and Y.

In the counter-substrate 20, in association with the first white display structure DP1 of the display section DP, a red resist 23R is disposed in the red sub-pixel R, a green resist 23G is disposed in the green sub-pixel G, and a blue resist 23B is disposed in the blue sub-pixel B.

On the other hand, in association with the second white display structure DP2 of the display section DP, the cyan sub-pixel C includes a cyan resist 23C which mainly passes green and blue wavelength components, which are included in white light that is emitted from the backlight BL. The magenta sub-pixel M includes a magenta resist 23M which mainly passes red and blue wavelength components, which are included in white light that is emitted from the backlight BL. The yellow sub-pixel Y includes a yellow resist 23Y which mainly passes red and green wavelength components, which are included in white light that is emitted from the backlight BL.

<<Third Example of Structure>>

Figure 6:
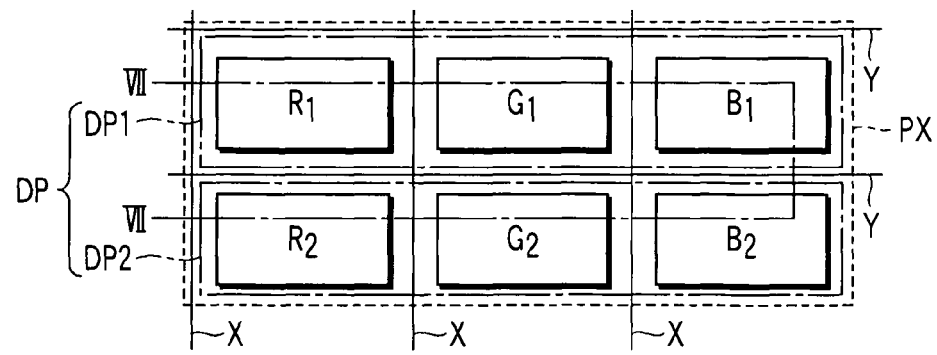
FIG. 6 schematically shows the structure of a display section of a liquid crystal display device according to a third example of structure in the first embodiment of the invention.

As is shown in FIG. 6, in a liquid crystal display device according to a third example of structure, each pixel PX has a display section DP comprising a first white display structure DP1 and a second white display structure DP2. The first white display structure DP1 is composed of three sub-pixels of red (R1), green (G1) and blue (B1). The second white display structure DP2 is composed of three sub-pixels of red (R2), green (G2) and blue (B2). In short, in the third example of structure, one pixel PX is composed of six sub-pixels R1, G1, B1, R2, G2 and B2.

The colors of the sub-pixels are set such that the chromaticity of at least one of the colors of the second white display structure DP2 is different from the chromaticity of the same color in the first white display structure DP1. In this example, the chromaticity of the red sub-pixel R2 differs from the chromaticity of the red sub-pixel R1. The chromaticity of the green sub-pixel G2 differs from the chromaticity of the green sub-pixel G1. The chromaticity of the blue sub-pixel B2 differs from the chromaticity of the blue sub-pixel B1. In short, the colors of the sub-pixels are set such that the chromaticities of the colors of all the sub-pixels of the second white display structure DP2 are not the same as those of the colors of all the sub-pixels of the first white display structure DP1 (in other words, the following setting is excluded: the chromaticity of the sub-pixel R1 is the same as that of the sub-pixel R2, the chromaticity of the sub-pixel G1 is the same as that of the sub-pixel G2, and the chromaticity of the sub-pixel B1 is the same as that of the sub-pixel B2).

Figure 7:
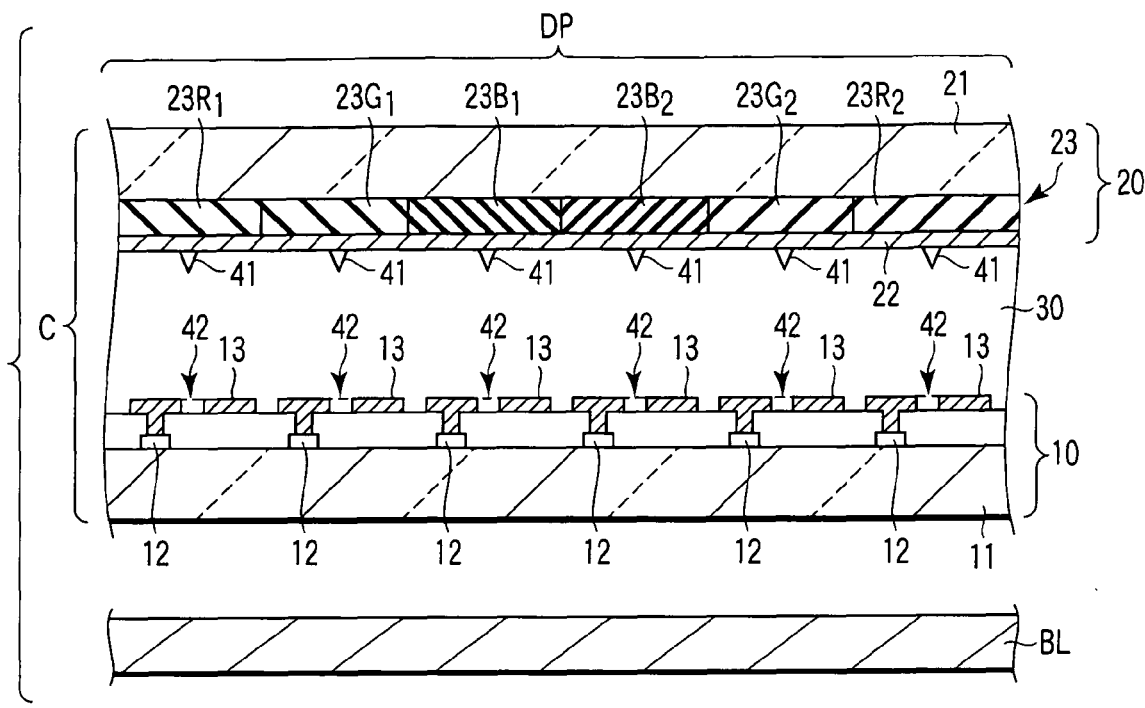
FIG. 7 is a cross-sectional view, taken along line VII-VII in FIG. 6, which schematically shows the structure of the display section of the liquid crystal display device shown in FIG. 6.

A more specific structure is described. The concrete structure of each sub-pixel is the same as in the first example of structure. The structural elements common to those in the first example of structure are denoted by like reference numerals, and a detailed description thereof is omitted. As shown in FIG. 6 and FIG. 7, switching elements 12 are disposed near intersections between the scanning lines Y and signal lines X in association with the sub-pixels R1, G1, B1, R2, G2 and B2. Pixel electrodes 13 are also disposed in association with the sub-pixels R1, G1, B1, R2, G2 and B2.

In the counter-substrate 20, in association with the first white display structure DP1 of the display section DP, a red resist 23R1 is disposed in the red sub-pixel R1, a green resist 23G1 is disposed in the green sub-pixel G1, and a blue resist 23B1 is disposed in the blue sub-pixel B1.

On the other hand, in association with the second white display structure DP2 of the display section DP, the red sub-pixel R2 includes a red resist 23R2 which mainly passes a red wavelength component, which is included in white light that is emitted from the backlight BL and is different from a red wavelength component that is passed by the red resist 23R1. The green sub-pixel G2 includes a green resist 23G2 which mainly passes a green wavelength component, which is included in white light that is emitted from the backlight BL and is different from a green wavelength component that is passed by the green resist 23G1. The blue sub-pixel B2 includes a blue resist 23B2 which mainly passes a blue wavelength component, which is included in white light that is emitted from the backlight BL and is different from a blue wavelength component that is passed by the blue resist 23B1.

<<Gradation Control Method in the First Embodiment>>

Figure 8:
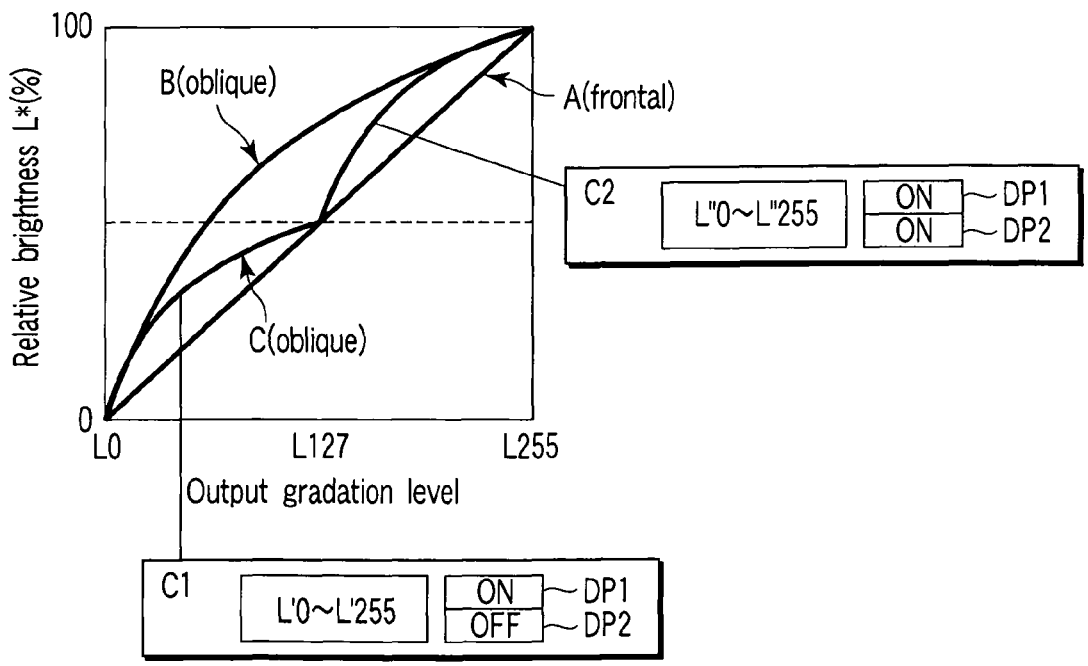
FIG. 8 is a view for explaining a gradation control method according to this embodiment, FIG. 8 showing an example of output characteristics of a relative brightness to gradation levels in each pixel.

To begin with, the output characteristics of relative brightness to gradation levels in each pixel PX of, in particular, MVA mode, are explained in the case where the display section DP of each pixel PX is composed of a single white display structure (e.g. red sub-pixel R, green sub-pixel G and blue sub-pixel B). In the output characteristics shown in FIG. 8, the number of gradation levels, which is plotted on the abscissa, is 256 (L0 to L255), and the relative brightness L*, which is plotted on the ordinate, indicates a relative value of brightness at each gradation level, with the brightness at a minimum gradation level (L0) being set at 0% and the brightness at a maximum gradation level (L255) being set at 100%.

The gradation control unit GC controls a voltage, which is applied to the display section DP, so that the output characteristics (A in FIG. 8) of the relative brightness to the gradation levels may become substantially linear when the MVA mode liquid crystal display device is observed in its normal direction. However, the output characteristics (B in FIG. 8) at the time when the liquid crystal display device is observed in an oblique direction (e.g. at a tilt angle of 80° to the normal direction) deviate to a greater degree from the output characteristics obtained when the liquid crystal display device is observed in the normal direction, as the title angle to the normal direction becomes greater. In particular, the relative brightness at a gradation level corresponding to an intermediate gradation becomes substantially equal to a relative brightness at a higher gradation level (i.e. gradation level near a white display level), and a display image becomes whitish. It is thus difficult to display an intermediate gradation with good display quality. At the same gradation level, a maximum difference $\Delta L^*$max of relative brightness between the output characteristics in the normal direction and the output characteristics in the oblique direction is about 40%.

In the first embodiment, in a first control mode, the gradation control unit GC turns on one of the first white display structure DP1 and second white display structure DP2, and turns off the other, thus preventing the other from contributing to display. Specifically, in the example shown in FIG. 8, in the first control mode, the gradation control unit GC outputs gradation levels in a dark-side first gradation range (e.g. a dark-side half of all gradation levels; gradation levels L0 to L127) as gradation levels for each pixel PX.

In the first gradation range, only the first white display structure DP1 is driven, and the second white display structure DP2 is kept in the OFF state (black display state). In other words, the gradation range, which is displayable by the first white display structure DP1, for example, the range of gradation levels L'0 to L'255, is assigned to the dark-side first gradation range for each pixel PX. Thereby, the output characteristics (C1 in FIG. 8) at the time when the display device is observed in the oblique direction vary similarly with the output characteristics (B in FIG. 8) in the case of forming the display section DP of the single white display structure, but the difference from the output characteristics at the time the display device is observed in the frontal direction is small and a maximum difference $\Delta L^*$max of relative brightness is about 25%.

In a second control mode, the gradation control unit GC turns on both the first white display structure DP1 and second white display structure DP2. Specifically, in the example shown in FIG. 8, in the second control mode, the gradation control unit GC outputs gradation levels in a light-side second gradation range (e.g. a light-side half of all gradation levels; gradation levels L128 to L255) as gradation levels for each pixel PX.

In the second gradation range, the first white display structure DP1 is kept in such a driving state as to output its maximum gradation level L'255, and the second white display structure DP2 is also driven in combination. Specifically, while the first white display structure DP1 outputs fixed gradation levels, the gradation range, which is displayable by the second white display structure DP2, for example, the range of gradation levels L"0 to L"255, is assigned to the light-side second gradation range for each pixel PX. Thereby, the output characteristics (C2 in FIG. 8) at the time the display device is observed in the oblique direction vary similarly with the output characteristics (B in FIG. 8) in the case of forming the display section DP of the single white display structure, but the difference from the output characteristics at the time the display device is observed in the frontal direction is small and a maximum difference ΔL*max of relative brightness is about 25%.

In the above description, the assignment of the control modes is executed by the gradation control unit GC on the basis of gradation levels. It is not always necessary to divide all the gradation levels of each pixel into halves and assign them to the respective control modes, and various modifications can be made. The assignment of the control modes may be executed by the gradation control unit GC on the basis of the relative brightness.

According to the gradation control method of the first embodiment, even when the liquid crystal display device is observed in the oblique direction, the same display quality as in the case where the display device is observed in the normal direction can be obtained. In particular, the gradation control unit GC executes driving by combining the first control mode and second control mode with respect to the gradation levels corresponding to intermediate gradations, so that the relative brightness in the normal direction may become substantially equal to the relative brightness in the oblique direction. Thereby, the variation in relative bright can be made closer to a linear variation, and the display quality of intermediate gradations can be improved.

Figure 9:
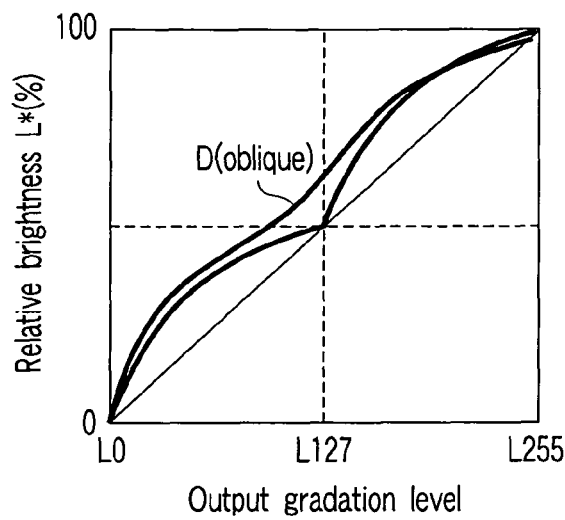
FIG. 9 is a view for explaining a more desirable gradation control method according to the embodiment.

As shown in FIG. 9, the gradation control unit GC may execute driving by combining the first control mode and second control mode so that the output characteristics of the relative brightness to the gradation level may be represented by a gentle curve. Thereby, the display quality of intermediate gradations can further be improved. Specifically, as shown by curve C in FIG. 8, an intermediate gradation tends to be degraded at a part with a locally small inclination (i.e. a part with a small variation in relative brightness to a variation in gradation level). However, if a curve, as indicated by D in FIG. 9, is gentle, a part with a small inclination is small. In particular, an intermediate gradation is visually recognized in a linearly varying manner, and the display quality is improved.

Next, a gradation control method in the first example of structure is described.

Figure 10:
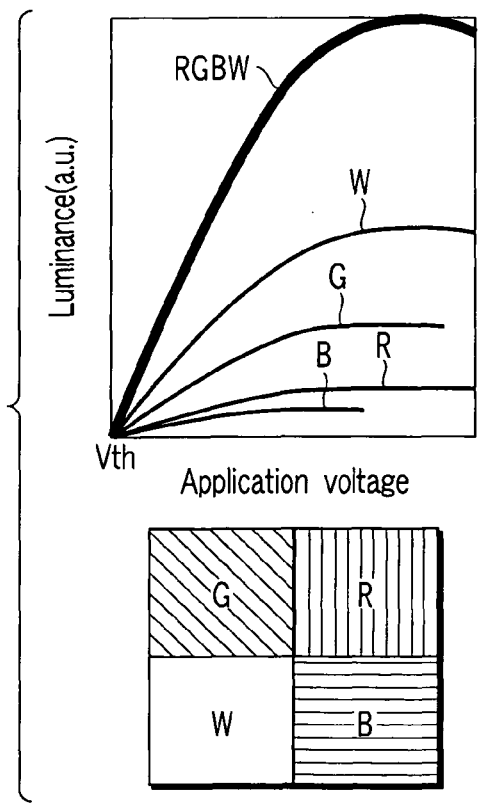
FIG. 10 is a view for explaining a gradation control method according to the first example of structure of the first embodiment, FIG. 10 showing characteristics of a relative luminance to application voltages of sub-pixels of each pixel.

Assume now that the sub-pixels R, G and B of the first white display structure DP1 and the sub-pixel W of the second white display structure DP2 have a relationship of relative luminances to application voltages, as shown in FIG. 10. The relative brightnesses of the single elements of the sub-pixel in each pixel PX are indicated by R, G, B and W, respectively. The relative brightness of the single display section DP in each pixel PX is indicated by "RGBW".

Figure 11A:
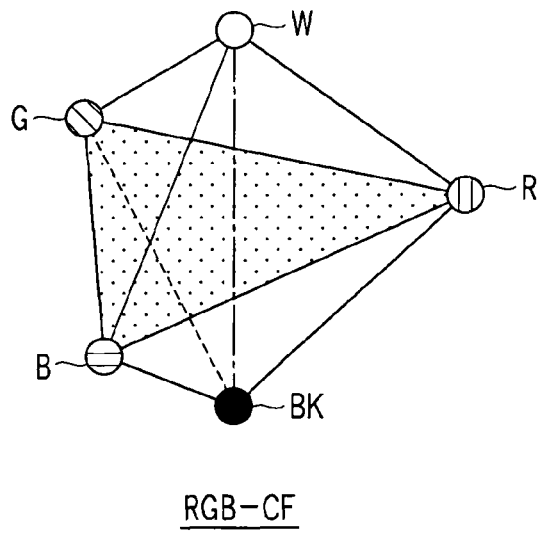
FIG. 11A schematically shows a color reproduction range which can be realized in a case where a display section of each pixel is composed of a single white display structure.
Figure 11B:
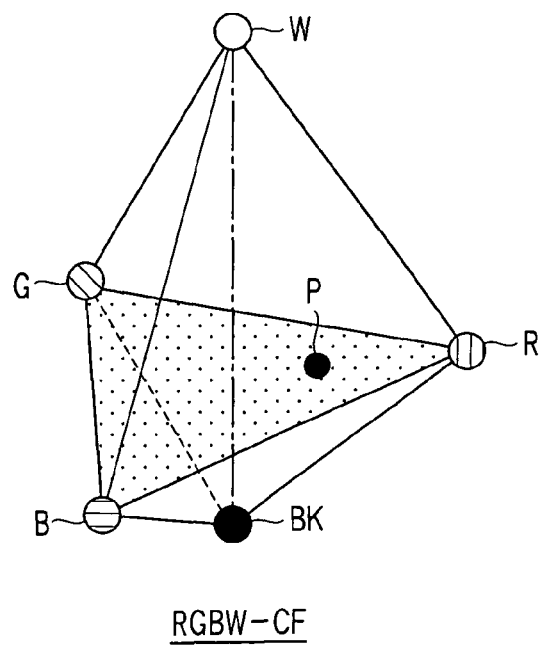
FIG. 11B schematically shows a color reproduction range which can be realized in a case where the gradation control method according to the embodiment is applied.

Chromaticity coordinates are set in an xy plane, and a color space, in which brightness L* is set in the normal direction, i.e. z direction, is now considered (BK corresponds to black display, and W corresponds to white display). In the case where the display section DP of each pixel PX is composed of the three primary-color sub-pixels, that is, the red sub-pixel R, green sub-pixel G and blue sub-pixel B, a hexahedral space, as shown in FIG. 11A, represents a range that is capable of color reproduction. On the other hand, in the case where the display section DP of each pixel PX is composed of the red sub-pixel pixel R, green sub-pixel G, blue sub-pixel B and white sub-pixel W as in the first example of structure, a hexahedral space, which is elongated in the z direction as shown in FIG. 11B, is obtained, and it is understood that the range that is capable of color reproduction can be increased. In the color spaces shown in FIG. 11A and FIG. 11B, it is assumed that a triangle that is formed by connecting R, G and B is positioned in the xy plane, and a line connecting W and BK is parallel to the z direction.

In the above-described sub-pixel structure, when the number of gradation levels that can be output by each sub-pixel is N and the number of sub-pixels of each pixel PX is S, the number of display colors, which can be output by the display section DP in each pixel PX, is expressed by $N^S$ (the S-th power of N). However, in this embodiment, the number of display colors, which are output by the display section DP, is $N^M$ (M<S).

For example, when the number of gradation levels, which can be output in each sub-pixel, is 256, and the number of sub-pixels is 4, the display section DP has such a performance as to be able to display $256^4$ display colors. Actually, however, the display section DP is set to display $256^3$ display colors. Accordingly, there are $N^{(S-M)}$, i.e. 256, means for outputting each color.

For instance, when the display section DP is to output pink P on the chromaticity coordinates shown in FIG. 11B, if the structure using only the first white display structure DP1 is adopted, for example, the structure in which the gradation level of the red sub-pixel R is set at L'200, the gradation level of the green sub-pixel G is set at L'20 and the gradation level of the blue sub-pixel B is set at L'20 (the gradation level of the white sub-pixel W is L"0) is adopted, a display image, when observed in an oblique direction, would become whitish and a desired color may not be reproduced.

By contrast, when pink P on the same chromaticity coordinates is to be output, if the structure using the combination of the first white display structure DP1 and second white display structure DP2 is adopted, for example, the structure in which the gradation level of the red sub-pixel R is set at L'180, the gradation level of the green sub-pixel G is set at L'0, the gradation level of the blue sub-pixel B is set at L'0 and the gradation level of the white sub-pixel W is L"20 is adopted, the whitishness of the display image is improved regardless of the viewing angle, and a desired color can be reproduced.

As described above, when the display section DP is to output a certain color, there are a plurality of means for outputting the color. If a combination of output means, which can improve whitishness in both the normal direction and oblique direction, is selected, it becomes possible to reproduce any color with good display quality, regardless of the viewing angle.

The gradation control method in the first example of structure has been described above. As regards the second example of structure, cyan (C), magenta (M) and yellow (Y), which have coordinates on the outside of the triangle that connects red (R), green (G) and blue (B) on the chromaticity diagram, are combined in addition to the red (R), green (G) and blue (B). Thereby, the range that is capable of color reproduction corresponds to a substantially dodecahedral color space, and the range of color reproduction can be increased.

Similarly, as regards the third example of structure, red (R2), green (G2) and blue (B2), which have coordinates on the outside of the triangle that connects red (R1), green (G1) and blue (B1) on the chromaticity diagram, are combined in addition to the red (R1), green (G1) and blue (B1). Thereby, the range that is capable of color reproduction corresponds to a substantially dodecahedral color space, and the range of color reproduction can be increased.

Next, an example of the gradation control method for pink in the sub-pixel structure according to the first example of structure is explained.

Figure 12:
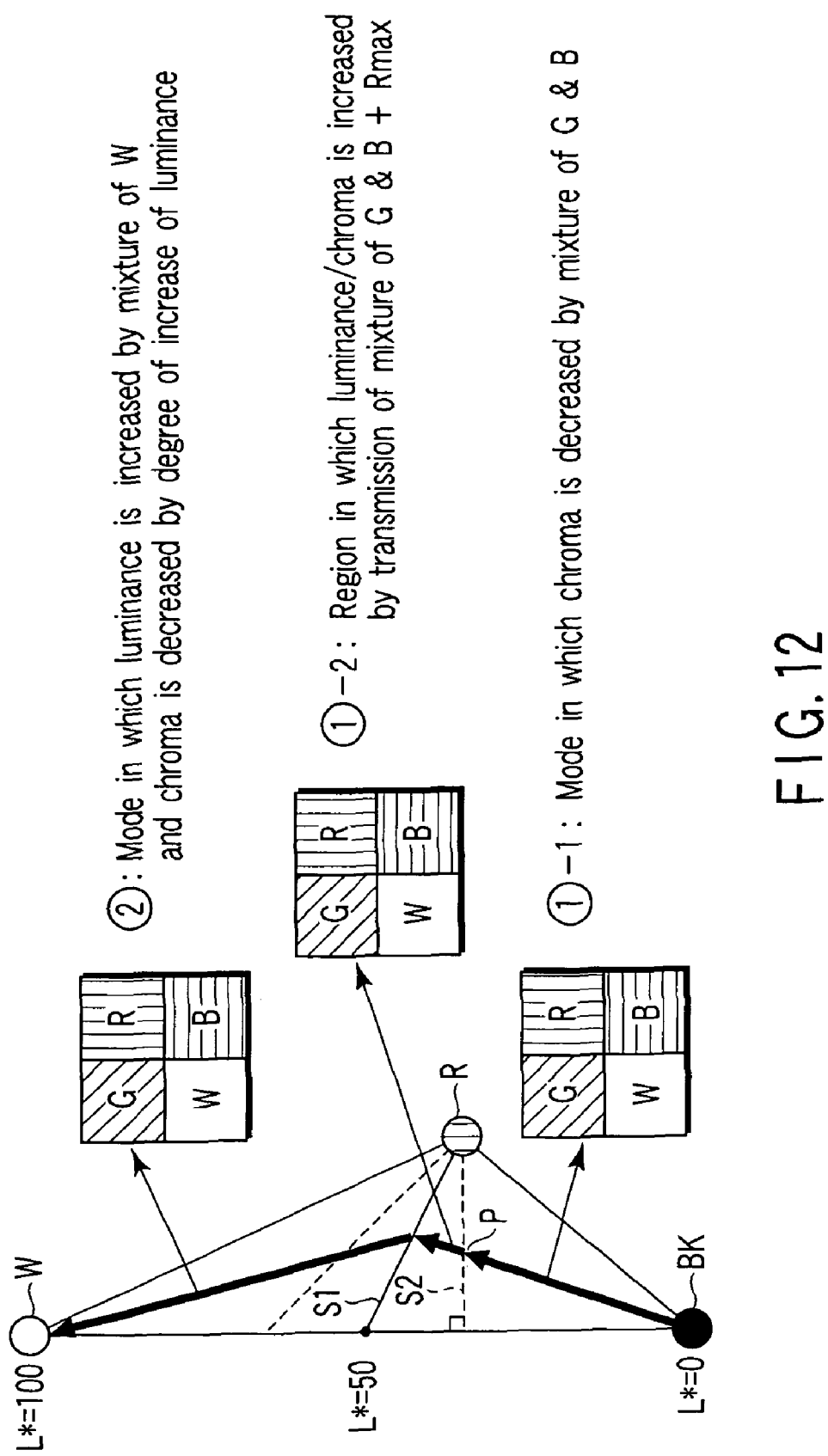
FIG. 12 is a view for explaining a gradation control method for pink in the first example of structure of the first embodiment.

As is shown in FIG. 12, as regards pink P on the chromaticity diagram, the gradation control unit GC switches the first control mode and the second control mode, for example, by using, as a boundary for switching, a line segment S1 which connects a chromaticity coordinate of red (i.e. chromaticity coordinate of red sub-pixel R) on the chromaticity diagram and a point of 50% on the axis of relative brightness L*.

Specifically, the gradation control unit GC selects the first control mode by setting a minimum gradation level at a point of 0% on the axis of relative brightness L*, and setting a range between the minimum gradation level and the line segment S1 as a dark-side first gradation range. In addition, the gradation control unit GC selects the second control mode by setting a maximum gradation level at a point of 100% on the axis of relative brightness L*, and setting a range between the line segment S1 and the maximum gradation level as a light-side second gradation range. The above-mentioned first gradation range is further divided into a dark-side gradation range and a light-side gradation range, with a boundary being set at a perpendicular line S2 that is drawn from the chromaticity coordinate of red on the chromaticity diagram to the axis of relative brightness L*.

When a gradation level in the dark-side gradation range within the first gradation range is to be output, the gradation control unit GC selects the first control mode, drives the red sub-pixel R and also drives the green sub-pixel G and blue sub-pixel B in combination. When a gradation level in the light-side gradation range within the first gradation range is to be output, the gradation control unit GC selects the first control mode, drives the red sub-pixel R so as to have the maximum gradation level, and also drives the green sub-pixel G and blue sub-pixel B in combination.

On the other hand, when a gradation level in the second gradation range is to be output, the gradation control unit GC selects the second control mode, drives the sub-pixels R, G and B of the first white display structure DP1, and also drives the white sub-pixel W of the second white display structure DP2 in combination.

As described above, the gradation control unit GC combines the first control mode and second control mode, thereby enabling reproduction of a desired color with a predetermined number of gradation levels, while achieving good display quality regardless of the viewing angle.

EXAMPLE 1

Circular-Polarization-Based MVA Mode

Figure 13:
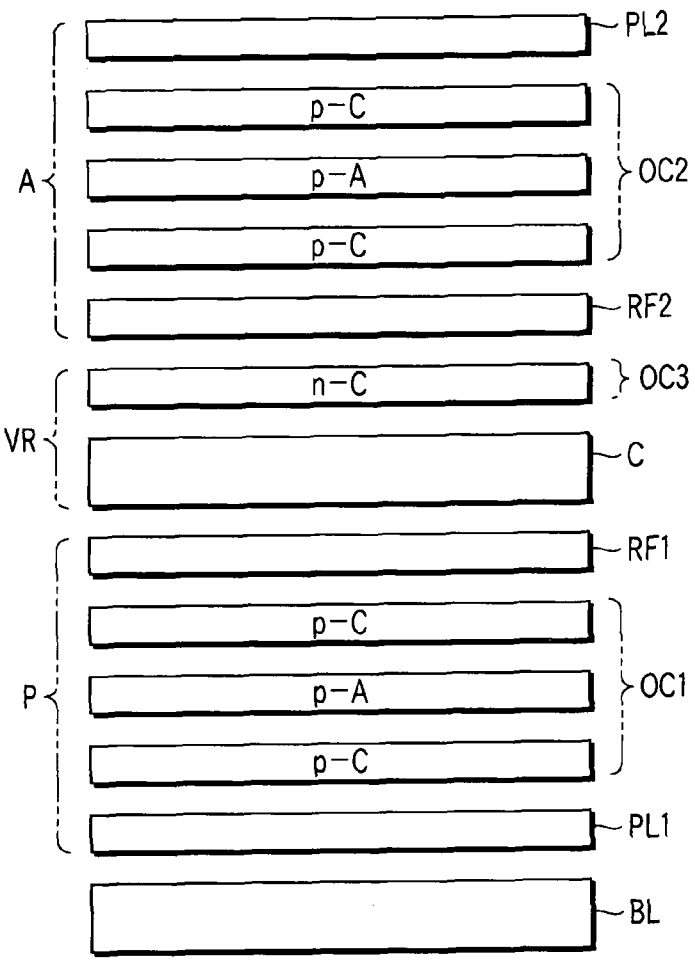
FIG. 13 is a view for describing the structure of a liquid crystal display device according to Example 1 of the first embodiment.

Next, Example 1, in which the first embodiment is applied, is described. As is shown in FIG. 13, a liquid crystal display device according to Example 1 is a liquid crystal display device of a circular-polarization-based vertical alignment mode in which liquid crystal molecules in each pixel are aligned substantially vertical to the major surface of the substrate in a voltage-off state. The liquid crystal display device comprises a circular polarizer structure P, a variable retarder structure VR, a circular analyzer structure A and a backlight BL which emits white light.

The variable retarder structure VR includes a dot-matrix liquid crystal cell C in which a liquid crystal layer is held between two electrode-equipped substrates. Each pixel may be formed with the structure of any one of the first to third examples of structure. Each pixel is divided into two domains.

The circular polarizer structure P is disposed on the backlight BL side of the liquid crystal cell C, and includes a first polarizer plate PL1 that is located between the liquid crystal cell C and the backlight BL, and a uniaxial first retardation plate RF1 that is disposed between the first polarizer plate PL1 and liquid crystal cell C. The circular analyzer structure A is disposed on the observation side of the liquid crystal cell C and includes a second polarizer plate PL2 that is disposed on the surface side, and a uniaxial second retardation plate RF2 that is disposed between the second polarizer plate PL2 and liquid crystal cell C.

Each of the first polarizer plate PL1 and second polarizer plate PL2 has a transmission axis and an absorption axis, which are substantially perpendicular to each other in the plane thereof. The first polarizer plate PL1 and second polarizer plate PL2 are disposed such that their transmission axes intersect at right angles with each other.

Each of the first retardation plate RF1 and second retardation plate RF2 is a uniaxial ¼ wavelength plate that has, within its plane, a fast axis and a slow axis, which are substantially perpendicular to each other, and provides a phase difference of ¼ wavelength (i.e. in-plane phase difference of 140 nm) between light rays with a predetermined wavelength (e.g. 550 nm), which pass through the fast axis and slow axis. The first retardation plate RF1 and second retardation plate RF2 are disposed such that their slow axes intersect at right angles with each other. The first retardation plate RF1 is disposed such that its slow axis forms an angle of about 45° with respect to the absorption axis of the first polarizer plate PL1. Similarly, the second retardation plate RF2 is disposed such that its slow axis forms an angle of about 45° with respect to the absorption axis of the second polarizer plate PL2.

The circular polarizer structure P includes a first optical compensation layer OC1, which is disposed for optical compensation of the circular polarizer structure P between the first polarizer plate PL1 and first retardation plate RF1. The circular analyzer structure A includes a second optical compensation layer OC2, which is disposed for optical compensation of the circular analyzer structure A between the second polarizer plate PL2 and second retardation plate RF2. The variable retarder structure VR includes a third optical compensation layer OC3, which is disposed for optical compensation of the variable retarder structure VR between the first retardation plate RF1 and second retardation plate RF2.

Specifically, the first optical compensation layer OC1 compensates the viewing angle characteristics of the circular polarizer structure P so that emission light from the circular polarizer structure P may become substantially circularly polarized light, regardless of the direction of emission. The second optical compensation layer OC2 compensates the viewing angle characteristics of the circular analyzer structure A so that emission light from the circular analyzer structure A may become substantially circularly polarized light, regardless of the direction of emission. The third optical compensation layer OC3 compensates the viewing angle characteristics of the phase difference of the liquid crystal cell C in the variable retarder structure VR (i.e. an optically positive normal-directional phase difference of the liquid crystal layer in the state in which the liquid crystal molecules are aligned substantially vertical to the major surface of the substrate, that is, in the state of black display).

The first optical compensation layer OC1 and second optical compensation layer OC2 are similarly constructed, for example, such that an optically uniaxial positive A-plate (p-A), which has a refractive index anisotropy of $nx>ny\equiv nz$, is interposed between two optically uniaxial positive C-plates (p-C) each having a refractive index anisotropy of $nx\equiv ny<nz$.

The third optical compensation layer OC3 is formed of, e.g. an optically uniaxial negative C-plate (n-c) which has a refractive index anisotropy of $nx\equiv ny>nz$.

To be more specific, an F-based liquid crystal (manufactured by Merck Ltd.) was used as a nematic liquid crystal material with negative dielectric anisotropy for the liquid crystal layer in the liquid crystal cell C. The refractive index anisotropy Δn of the liquid crystal material used in this case is 0.09 (wavelength for measurement=550 nm; in the description below, all refractive indices and phase differences of retardation plates are values measured at wavelength of 550 nm), and the thickness d of the liquid crystal layer is 3.1 μm.

A polarizer plate of SRW062A (manufactured by Sumitomo Chemical Co., Ltd.) was used as the first polarizer plate PL1 and second polarizer plate PL2. A uniaxial ¼ wavelength plate (in-plane phase difference=140 nm), which is formed of ZEONOR resin (manufactured by Nippon Zeon Co., Ltd.), was used as the first retardation plate RF1 and second retardation plate RF2. A uniaxial positive A-plate (in-plane phase difference=130 nm), which is formed of ZEONOR resin (manufactured by Nippon Zeon Co., Ltd.), was used as the positive A-plate (p-A). A uniaxial positive C-plate (normal-directional phase difference=70 nm), which is formed of a liquid crystal polymer resin manufactured by DAINIPPON INK & CHEMICALS, INC., was used as the positive C-plate (p-C). A uniaxial negative C-plate (normal-directional phase difference=−110 nm), which is formed of a liquid crystal polymer resin manufactured by Nitto Denko, was used as the negative C-plate (n-C).

As regards the above-described structure of Example 1, the output characteristics of the relative brightness to the gradation levels were measured. In this measurement, the output characteristics were measured with respect each of viewing angles in the up-and-down azimuth direction and right-and-left azimuth direction of the screen on which an image was displayed. For the purpose of comparison, as regards the case in which each display section is formed of a single white display structure (three primary-color sub-pixels of the red sub-pixel R, green sub-pixel G and blue sub-pixel B), the output characteristics at the time the display was observed in an oblique direction with a tilt angle of 80° to the normal direction were measured.

Figure 14A:
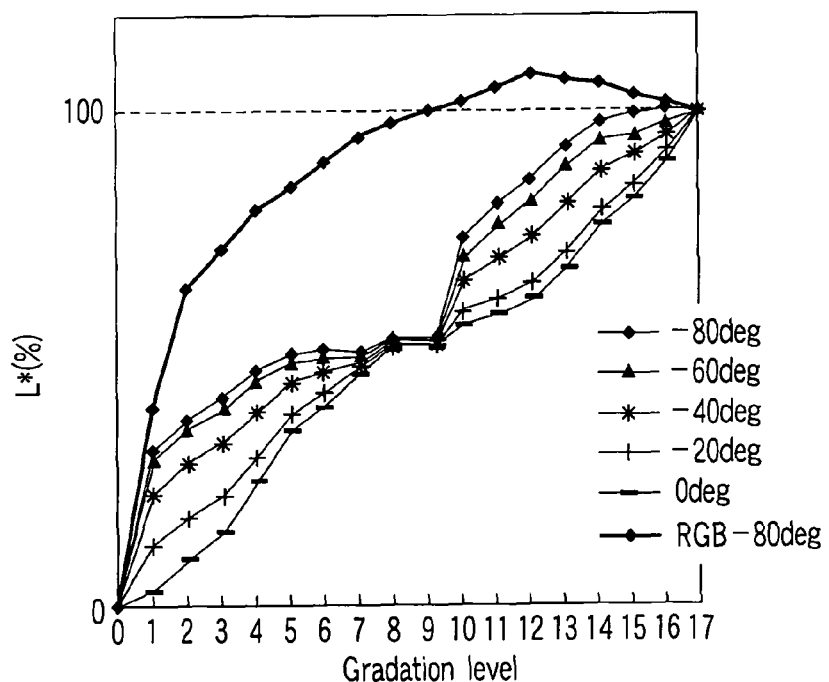
FIG. 14A is a view showing a measurement result of output characteristics of a relative brightness to gradation levels in an up-and-down azimuth direction of the screen of the liquid crystal display device according to Example 1.

As is shown in FIG. 14A, as regards the up-and-down azimuth direction, the output characteristics in the comparative example generally differ from those in the normal direction (0 deg.) with respect to the relative brightness. At low gradation levels, the relative brightness varies sharply. In a range of intermediate gradation levels to high gradation levels, the relative brightness varies slightly. As a result, a whitish display image was obtained. On the other hand, in the case where the above-described gradation control method is applied to the structure of Example 1, the difference from the output characteristics in the normal direction increases as the tilt angle becomes greater, but this difference is not so great as that in the comparative example and a generally gentle curve of output characteristics was obtained. In particular, it was confirmed that a good display quality was obtained even at gradation levels corresponding to intermediate gradation levels.

As is shown in FIG. 14B, similarly as regards the right-and-left azimuth direction, in the case where the above-described gradation control method is applied to the structure of Example 1, a generally gentle curve of output characteristics was obtained even if the tilt angle increases, and it was confirmed that a good display quality was obtained even at gradation levels corresponding to intermediate gradation levels.

EXAMPLE 2

Linear-Polarization-Based MVA Mode

Next, Example 2, in which the first embodiment is applied, is described. As is shown in FIG. 15, a liquid crystal display device according to Example 2 is a liquid crystal display device of a linear-polarization-based vertical alignment mode in which liquid crystal molecules in each pixel are aligned substantially vertical to the major surface of the substrate in a voltage-off state. The liquid crystal display device comprises a circular polarizer structure P, a variable retarder structure VR, a circular analyzer structure A and a backlight BL which emits white light. The structural parts common to those in Example 1 are denoted by like reference numerals, and a detailed description thereof is omitted.

The variable retarder structure VR includes a dot-matrix liquid crystal cell C in which a liquid crystal layer is held between two electrode-equipped substrates. Each pixel may be formed with the structure of any one of the first to third examples of structure. Each pixel is divided into two domains.

The circular polarizer structure P includes a first polarizer plate PL1 that is disposed on the backlight BL side of the liquid crystal cell C, and a biaxial first retardation plate RF1 that is disposed between the first polarizer plate PL1 and liquid crystal cell C. The circular analyzer structure A includes a second polarizer plate PL2 that is disposed on the observation side of the liquid crystal cell C, and a biaxial second retardation plate RF2 that is disposed between the second polarizer plate PL2 and liquid crystal cell C.

Each of the first polarizer plate PL1 and second polarizer plate PL2 has a transmission axis and an absorption axis, which are substantially perpendicular to each other in the plane thereof. The first polarizer plate PL1 and second polarizer plate PL2 are disposed such that their transmission axes intersect at right angles with each other.

Each of the first retardation plate RF1 and second retardation plate RF2 is a retardation plate that has, within its plane, a fast axis and a slow axis, which are substantially perpendicular to each other, and has a refractive index anisotropy of nx>ny>nz. The first retardation plate RF1 and second retardation plate RF2 are disposed such that their slow axes intersect at right angles with each other. The first retardation plate RF1 is disposed such that its slow axis intersects substantially at right angles with the absorption axis of the first polarizer plate PL1. Similarly, the second retardation plate RF2 is disposed such that its slow axis intersects substantially at right angles with the absorption axis of the second polarizer plate PL2.

To be more specific, an F-based liquid crystal (manufactured by Merck Ltd.) was used as a nematic liquid crystal material with negative dielectric anisotropy for the liquid crystal layer in the liquid crystal cell C. The refractive index anisotropy Δn of the liquid crystal material used in this case is 0.09 (wavelength for measurement=550 nm; in the description below, all refractive indices and phase differences of retardation plates are values measured at wavelength of 550 nm), and the thickness d of the liquid crystal layer is 3.1 μm.

A polarizer plate of SRW062A (manufactured by Sumitomo Chemical Co., Ltd.) was used as the first polarizer plate PL1 and second polarizer plate PL2. ZEONOR II (manufactured by Nippon Zeon Co., Ltd.) was used for the first retardation plate RF1 and second retardation plate RF2 (in-plane phase difference=50 nm; normal-directional phase difference=110 nm).

As regards the above-described structure of Example 2, the output characteristics of the relative brightness to the gradation levels were measured. In this measurement, the output characteristics were measured with respect each of viewing angles in the up-and-down azimuth direction and right-and-left azimuth direction of the screen on which an image was displayed. For the purpose of comparison, as regards the case in which each display section is formed of a single white display structure (the red sub-pixel R, green sub-pixel G and blue sub-pixel B), the output characteristics at the time the display was observed in an oblique direction with a tilt angle of 80° to the normal direction were measured.

As is shown in FIG. 16A, as regards the up-and-down azimuth direction, in the case where the above-described gradation control method is applied to the structure of Example 2, output characteristics, which are substantially equal to those in the normal direction (0 deg.), were obtained. In particular, it was confirmed that a good display quality was obtained even at gradation levels corresponding to intermediate gradation levels.

As is shown in FIG. 16B, as regards the right-and-left azimuth direction, the output characteristics in the comparative example generally differ from those in the normal direction (0 deg.) with respect to the relative brightness. At low gradation levels, the relative brightness varies sharply. In a range of intermediate gradation levels to high gradation levels, the relative brightness varies slightly. As a result, a whitish display image was obtained. On the other hand, in the case where the above-described gradation control method is applied to the structure of Example 2, the difference from the output characteristics in the normal direction increases as the tilt angle becomes greater, but this difference is not so great as that in the comparative example and a generally gentle curve of output characteristics was obtained. In particular, it was confirmed that a good display quality was obtained even at gradation levels corresponding to intermediate gradation levels.

Second Embodiment

Sub-Frame Structure

Figure 17:
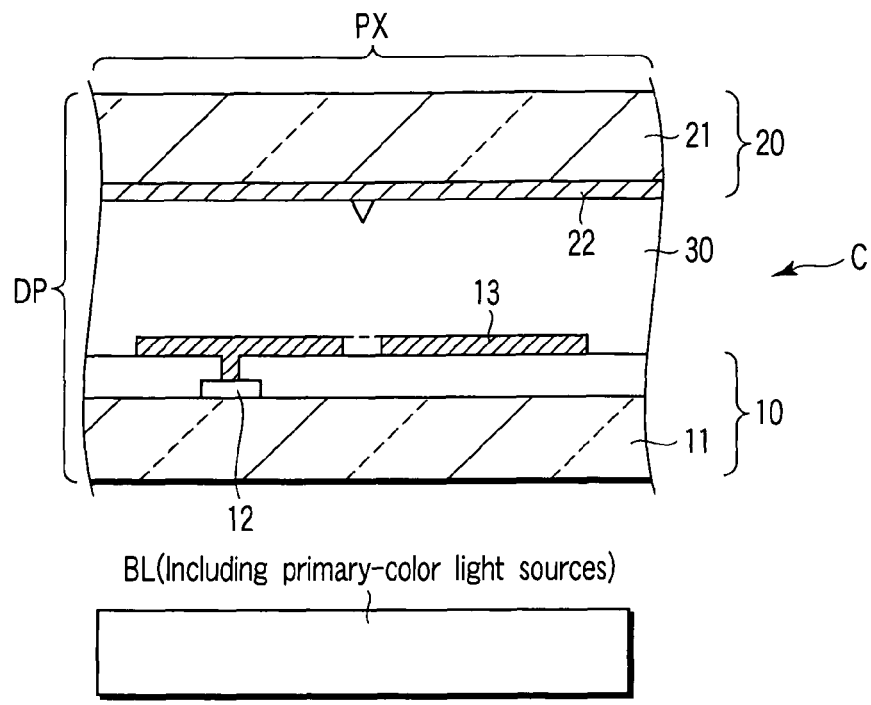
FIG. 17 is a view for describing the structure of a display section of a liquid crystal display device according to a second embodiment of the invention.

In a second embodiment, as shown in FIG. 17, each pixel PX is configured to include one switching element 12 and one pixel electrode 13 which is connected to the switching element 12. A liquid crystal cell C including this pixel PX is combined with a backlight BL which functions as an area light source device, and a field sequential driving scheme is applied. Thereby, the display section DP can effect color display in each pixel PX. Specifically, the backlight BL is configured to include primary-color light sources. Each display section DP controls the transmission state of the liquid crystal cell C at a timing when the primary-color light sources are sequentially turned on. Thus, one frame is composed of a plurality of sub-frames for displaying images of the respective primary colors. The second embodiment will be described below, by referring to first to third examples of structure.

<<First Example of Structure>>

Figure 18:
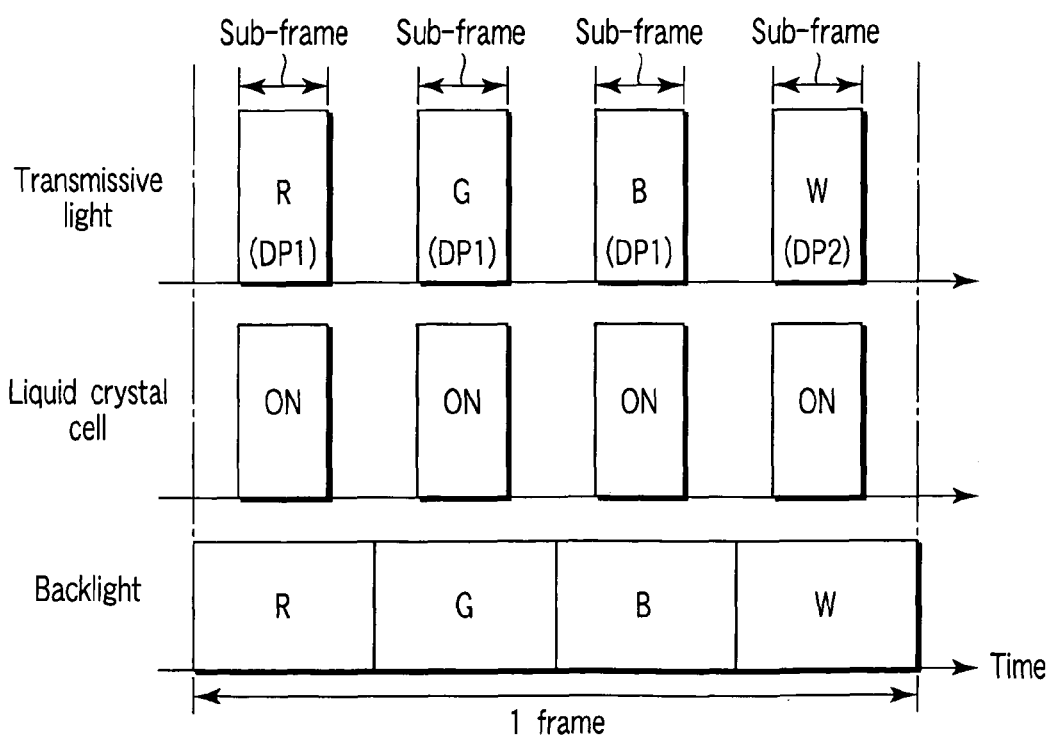
FIG. 18 is a view for explaining a driving method by a display section of a liquid crystal display device according to a first example of structure in the second embodiment of the invention.

As is shown in FIG. 18, in a liquid crystal display device according to a first example of structure, the display section DP is driven so as to constitute one frame which is composed of sub-frames for sequentially displaying primary colors by a first white display structure DP1, and a sub-frame for displaying white by a second white display structure DP2. In the example shown in FIG. 18, the first white display structure DP1 is composed of three sub-frames of red (R), green (G) and blue (B). Alternatively, the first white display structure DP1 may be composed of three sub-frames of cyan (C), magenta (M) and yellow (Y). In short, in the first example of structure, one frame is composed of four sub-frames R, G, B and W.

A more specific structure is described. The liquid crystal cell C is basically structured in the same fashion as in the first embodiment. However, the liquid crystal cell C does not include a color filter. Each display section DP substantially divides one frame by 4, thereby to enable the associated pixel PX to effect color display. In the sub-frame R for displaying red, the display section DP sets the pixel PX in an ON state (i.e. light-transmissive state) at a timing when red light is emitted from the backlight, thus mainly passing a red wavelength component. Similarly, in the sub-frame G for displaying green, the display section DP sets the pixel PX in the ON state at a timing when green light is emitted from the backlight, thus mainly passing a green wavelength component. In the sub-frame B for displaying blue, the display section DP sets the pixel PX in the ON state at a timing when blue light is emitted from the backlight, thus mainly passing a blue wavelength component. In the sub-frame W for displaying white, the display section DP sets the pixel PX in the ON state at a timing when white light is emitted from the backlight, thus mainly passing white light.

<<Second Example of Structure>>

Figure 19:
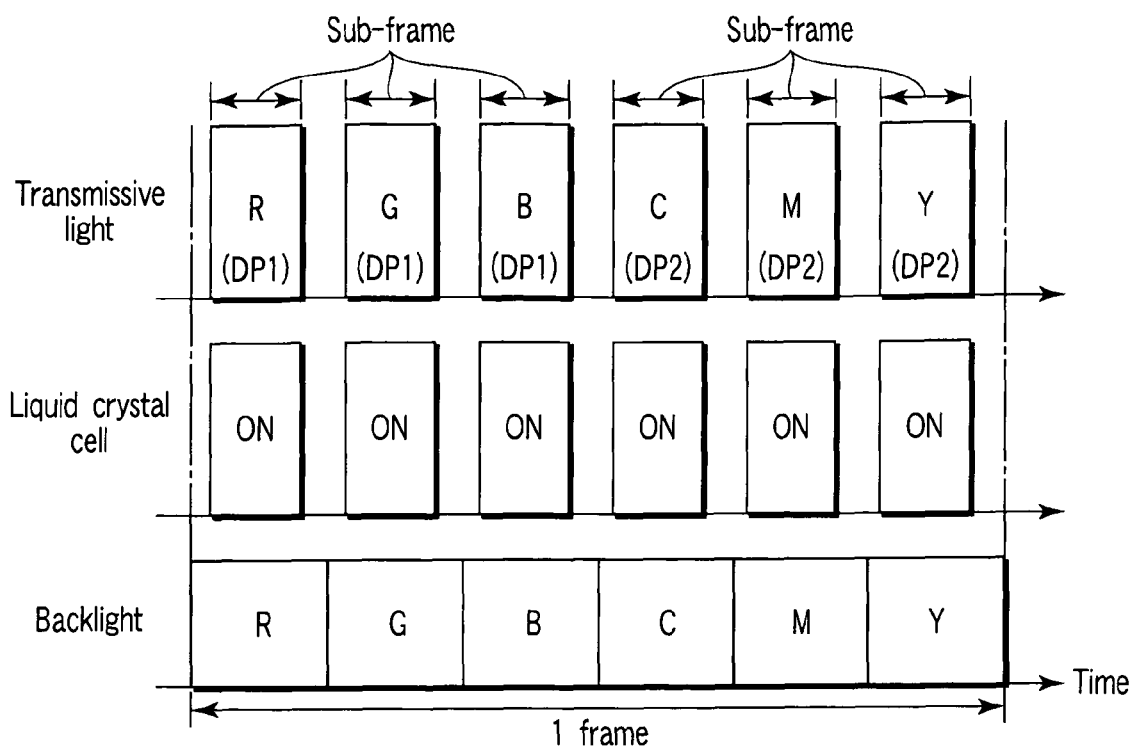
FIG. 19 is a view for explaining a driving method by a display section of a liquid crystal display device according to a second example of structure in the second embodiment of the invention.

As is shown in FIG. 19, in a liquid crystal display device according to a second example of structure, the display section DP is driven so as to constitute one frame which is composed of three sub-frames for sequentially displaying red (R), green (G) and blue (B) by a first white display structure DP1, and three sub-frames for sequentially displaying cyan (C), magenta (M) and yellow (Y) by a second white display structure DP2. In short, in the second example of structure, one frame is composed of six sub-frames R, G, B, C, M and Y.

A more specific structure is described. Each display section DP substantially divides one frame by 6, thereby to enable the associated pixel PX to effect color display. In the sub-frame R for displaying red, the display section DP sets the pixel PX in an ON state (i.e. light-transmissive state) at a timing when red light is emitted from the backlight, thus mainly passing a red wavelength component. Similarly, in the sub-frame G for displaying green, the display section DP sets the pixel PX in the ON state at a timing when green light is emitted from the backlight, thus mainly passing a green wavelength component. In the sub-frame B for displaying blue, the display section DP sets the pixel PX in the ON state at a timing when blue light is emitted from the backlight, thus mainly passing a blue wavelength component.

Following the above-described three sub-frames, in the sub-frame C for displaying cyan, the display section DP sets the pixel PX in the ON state (light-transmissive state) at a timing when green and blue light is emitted from the backlight, thus mainly passing a cyan wavelength component. Similarly, in the sub-frame M for displaying magenta, the display section DP sets the pixel PX in the ON state at a timing when red and blue light is emitted from the backlight, thus mainly passing a magenta wavelength component. In the sub-frame Y for displaying yellow, the display section DP sets the pixel PX in the ON state at a timing when red and green light is emitted from the backlight, thus mainly passing a yellow wavelength component.

<<Third Example of Structure>>

Figure 20:
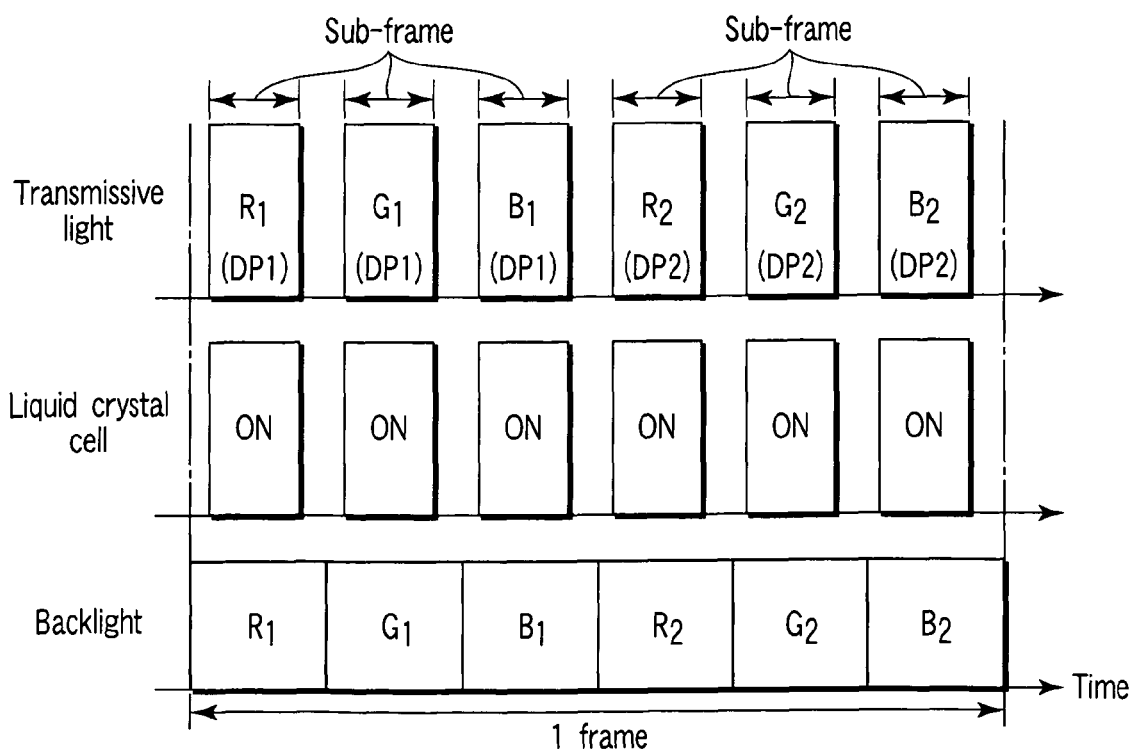
FIG. 20 is a view for explaining a driving method by a display section of a liquid crystal display device according to a third example of structure in the second embodiment of the invention.

As is shown in FIG. 20, in a liquid crystal display device according to a third example of structure, the display section DP is driven so as to constitute one frame which is composed of three sub-frames for sequentially displaying red (R1), green (G1) and blue (B1) by a first white display structure DP1, and three sub-frames for sequentially displaying red (R2), green (G2) and blue (B2) by a second white display structure DP2. In short, in the third example of structure, one frame is composed of six sub-frames R1, G1, B1, R2, G2 and B2.

The colors of the sub-frames are set such that the chromaticity of at least one of the colors displayed by the second white display structure DP2 is different from the chromaticity of the same color displayed by the first white display structure DP1. In this example, the chromaticity of the red sub-frame R2 differs from the chromaticity of the red sub-frame R1. The chromaticity of the green sub-frame G2 differs from the chromaticity of the green sub-frame G1. The chromaticity of the blue sub-frame B2 differs from the chromaticity of the blue sub-frame B1. In short, the colors of the sub-frames are set such that the chromaticities of the colors of all the sub-frames of the first white display structure are not the same as those of the colors of all the sub-frames of the second white display structure.

A more specific structure is described. Each display section DP substantially divides one frame by 6, thereby to enable the associated pixel PX to effect color display. In the sub-frame R1 for displaying red, the display section DP sets the pixel PX in an ON state (i.e. light-transmissive state) at a timing when red light is emitted from the backlight, thus mainly passing a red wavelength component. Similarly, in the sub-frame G1 for displaying green, the display section DP sets the pixel PX in the ON state at a timing when green light is emitted from the backlight, thus mainly passing a green wavelength component. In the sub-frame B1 for displaying blue, the display section DP sets the pixel PX in the ON state at a timing when blue light is emitted from the backlight, thus mainly passing a blue wavelength component.

Following the above-described three sub-frames, in the sub-frame R2 for displaying red, the display section DP sets the pixel PX in the ON state (light-transmissive state) at a timing when red light, whose major wavelength component differs from that of R1, is emitted from the backlight, thus mainly passing a red wavelength component. Similarly, in the sub-frame G2 for displaying green, the display section DP sets the pixel PX in the ON state at a timing when green light, whose major wavelength component differs from that of G1, is emitted from the backlight, thus mainly passing a green wavelength component. In the sub-frame B2 for displaying blue, the display section DP sets the pixel PX in the ON state at a timing when blue light, whose major wavelength component differs from that of B1, is emitted from the backlight, thus mainly passing a blue wavelength component.

The above-described gradation control method of the second embodiment is similarly applicable by replacing "sub-pixel" in the first embodiment with "sub-frame", and the same advantageous effect as in the first embodiment can be obtained.

In the above-described sub-frame structure, when the number of gradation levels that can be output by each sub-frame is N and the number of sub-frames that constitute one frame is S, the number of display colors, which can be output by the display section DP in each pixel PX, is expressed by $N^S$ (the S-th power of N). However, in this embodiment, the number of display colors, which are output by the display section DP, is expressed by $N^M$ (the M-th power of N) (M<S).

The present invention is not limited directly to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

For example, in the above-described embodiments, each pixel is configured to include two white display structures (i.e. first white display structure and second white display structure). Alternatively, each pixel may include three or more white display structures.

In the above-described embodiments, the backlight BL, which is disposed on the back side of the array substrate 10, is provided as the area light source device. Alternatively, a front light may be provided as an area light source device in a combination with a reflective liquid crystal cell.

What is claimed is:

1. A liquid crystal display device of a dot-matrix type which includes a liquid crystal layer held between a pair of substrates, comprising:
   a display section which enables color display in each of pixels, at least a first one of the pixels comprising:
      a first white display structure which is configured to combine primary colors and to display white, and
      a second white display structure which is configured to include a color with a chromaticity different from a chromaticity of the primary color of the first white display structure and to display white; and
   a gradation control unit which controls gradation levels of the first one of the pixels,
   wherein the gradation control unit has
      a first control mode in which the gradation levels of the first one of the pixels are controlled by turning on one of the first white display structure and the second white display structure and turning off another one of the first white display structure and the second white display structure, and
      a second control mode in which the gradation levels of the first one of the pixels are controlled by a combination of the first white display structure and the second white display structure.

2. The liquid crystal display device according to claim 1, wherein the first one of the pixels is composed of sub-pixels of the primary colors which constitute the first white display structure, and a sub-pixel of white which constitutes the second white display structure.

3. The liquid crystal display device according to claim 1, wherein the first one of the pixels is composed of sub-pixels of red, green and blue which constitute the first white display structure, and sub-pixels of yellow, magenta and cyan which constitute the second white display structure.

4. The liquid crystal display device according to claim 1, wherein
   the first one of the pixels is composed of sub-pixels of red, green and blue which constitute the first white display structure, and sub-pixels of red, green and blue which constitute the second white display structure, and
   a chromaticity of at least one of the colors of the second white display structure is different from a chromaticity of the same color in the first white display structure.

5. The liquid crystal display device according to claim 1, wherein the display section is driven such that one frame is composed of sub-frames which sequentially display the primary colors by the first white display structure, and a sub-frame which displays white by the second white display structure.

6. The liquid crystal display device according to claim 1, wherein the display section is driven such that one frame is composed of sub-frames which sequentially display red, green and blue by the first white display structure, and sub-frames which sequentially display yellow, magenta and cyan by the second white display structure.

7. The liquid crystal display device according to claim 1, wherein
   the display section is driven such that one frame is composed of sub-frames which sequentially display red, green and blue by the first white display structure, and sub-frames which sequentially display red, green and blue by the second white display structure, and
a chromaticity of at least one of the colors of the second white display structure is different from a chromaticity of the same color in the first white display structure.

8. The liquid crystal display device according to claim 1, wherein the first one of the pixels is composed of at least one first sub-pixel which constitutes the first white display structure, and at least one second sub-pixel which constitutes the second white display structure, and when a number of gradation levels that are outputtable by each sub-pixel is N and a number of sub-pixels of the first one of the pixels is S, a number of display colors, which are output by the display section in the first one of the pixels, is $N^M$ (the M-th power of N) (M<S).

9. The liquid crystal display device according to claim 1, wherein the display section is driven such that one frame is composed of a sub-frame which is displayed by the first white display structure, and a sub-frame which is displayed by the second white display structure, and when a number of gradation levels that are outputtable in each sub-frame is N and a number of sub-frames that constitute one frame is S, a number of display colors, which are output by the display section in each pixel, is $N^M$ (the M-th power of N) (M<S).

10. The liquid crystal display device according to claim 1, wherein the gradation control unit outputs gradation levels in a dark-side first gradation range in the first control mode, and outputs gradation levels in a light-side second gradation range, which is different from the first gradation range, in the second control mode.

11. The liquid crystal display device according to claim 10, wherein a relative brightness in a normal direction of the liquid crystal display device is substantially equal to a relative brightness in an oblique direction to the normal direction at gradation levels corresponding to intermediate gradations.

12. The liquid crystal display device according to claim 11, wherein in the oblique direction, output characteristics of a relative brightness to gradation levels are represented by a gentle curve.

* * * * *